May 2, 1967

F. A. BIGNELL ET AL 3,316,781

CABLE INSULATION STRIPPING APPARATUS

Filed June 1, 1966

INVENTORS
FREDERICK A. BIGNELL
GEORGE B. ERSKINE
BY
Amster & Rothstein

May 2, 1967   F. A. BIGNELL ET AL   3,316,781
CABLE INSULATION STRIPPING APPARATUS
Filed June 1, 1966   4 Sheets-Sheet 3

INVENTORS
FREDERICK A. BIGNELL
GEORGE B. ERSKINE
BY
Amster & Rothstein

United States Patent Office 3,316,781
Patented May 2, 1967

3,316,781
CABLE INSULATION STRIPPING APPARATUS
Frederick A. Bignell and George B. Erskine, Emporium, Pa., assignors to Emporium Specialties Co., Inc., Austin, Pa., a corporation of Pennsylvania
Filed June 1, 1966, Ser. No. 554,588
9 Claims. (Cl. 81—9.51)

The present invention relates generally to apparatus for stripping the insulation covering from cables, and more particularly to certain improvements in an apparatus for preparing cable insulation for removal from about the cable core which is readily engaged with a wide range of sizes of cables.

In the scrap industry, there exists a need for automatic equipment for efficiently removing cable insulation without causing damage to the cable core. The equipment must be rugged, operable with a minimum of skilled labor, and readily adapted to accommodate a variety of cable sizes. Further, in line with the general approach of removing the insulation by slitting, the engagement of the cable in the equipment must be firm and positive in driving the cable past appropriate cutting mechanisms which are effective to produce the slitting in the cable insulation. Although presently available models of cable-stripping apparatus are generally satisfactory in the results produced, an undesirable characteristic of this apparatus is the time and care required in setting up the cable for a production run through the apparatus.

Broadly, it is an object of the present invention to provide an improved cable-stripping apparatus overcoming the foregoing and other shortcomings of the prior art. Specifically, it is an object to provide an apparatus which is readily closed about the cable with little or no set-up time and effort required and which thereafter functions automatically to provide slits in a number and in locations lengthwise of the cable to enable ready removal of this insulation. Thus, it is an object to achieve sufficient slitting of the cable insulation with apparatus having appropriate operating elements appropriately powered to achieve this result, and also to embody such operating elements and the powering means therefor in the apparatus so that the cable is readily and easily engaged by the apparatus.

A cable insulation stripping apparatus demonstrating features and objects of the present invention comprises a pair of support frames arranged for relative movement about a pivot axis such that one of said frames, specifically the one having the degree of pivotal movement, can be readily closed about cable which is interposed between said frames. Appropriate elements including conveyors and rotary knives are respectively operatively mounted on the frames and are effective to engage, feed, and slit the cable insulation. An essential feature of the apparatus is the novel arrangement of the drive connection from the powering motors to the operating elements of the movable frame, such drive connection being effective to result in the efficient powering of these elements through movement while permitting unimpeded movement of the movable frame between the open and closed positions thereof relative to the other frame.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
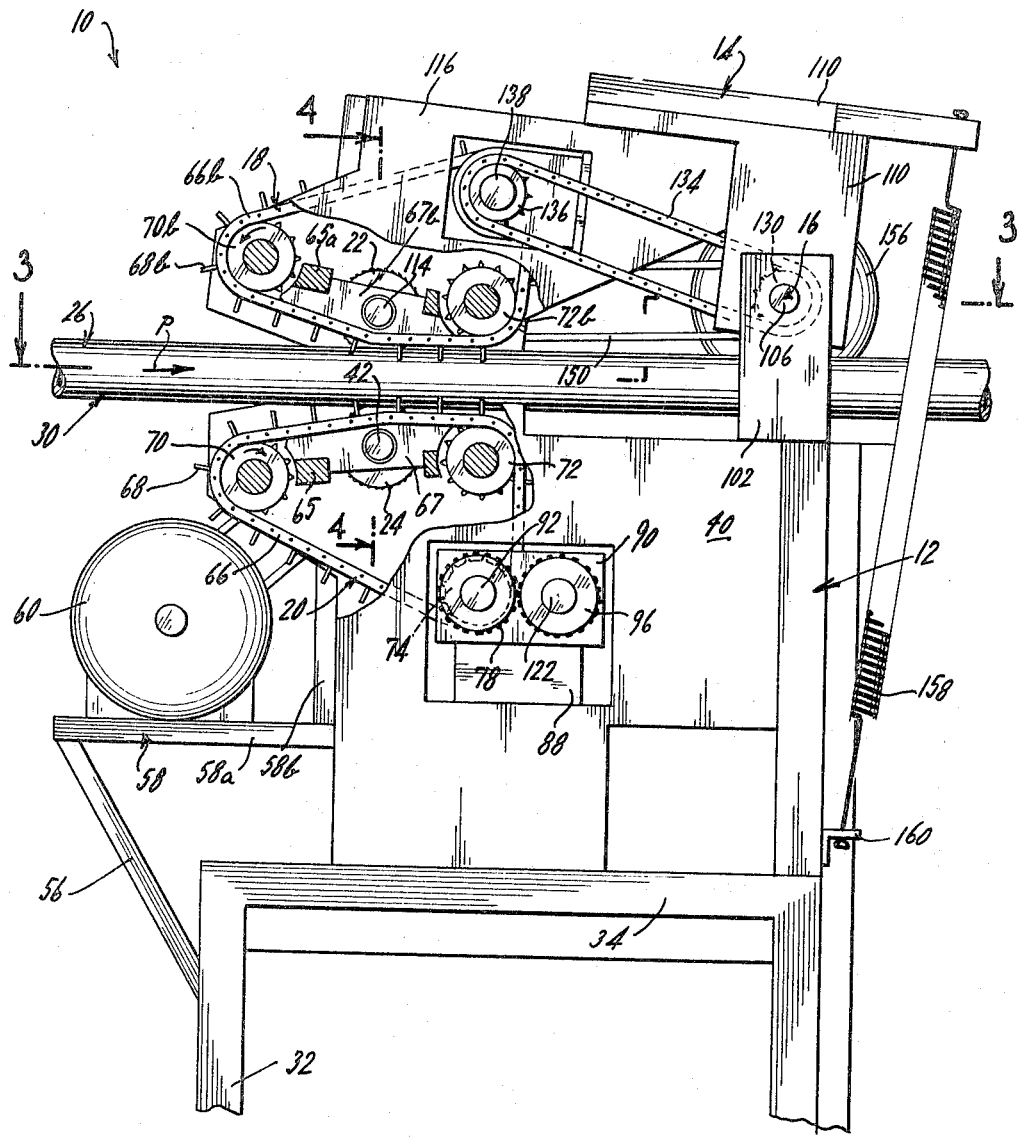
FIG. 1 is a front elevational view of the cable insulation stripping apparatus hereof, with portions broken away to better illustrate features of construction thereof.
Figure 4:
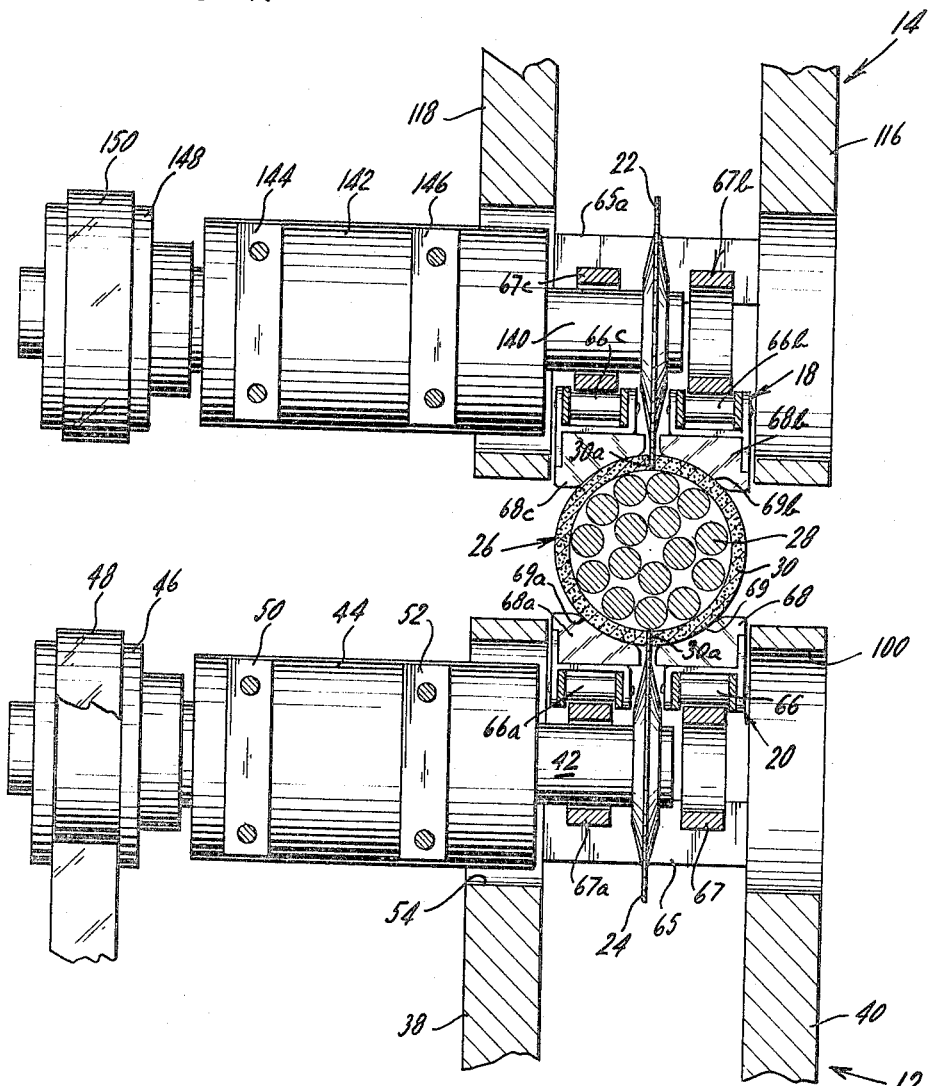
Figure 5:
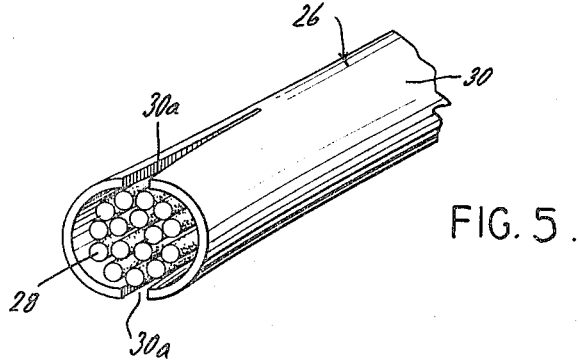

FIG. 4 is a partial side elevational view, on an enlarged scale and in section taken on line 4—4 of FIG. 1, illustrating further details of construction of the cable-advancing means and of the rotary knives which slit the cable insulation preparatory to the stripping thereof from the cable core; and FIG. 5 is a perspective view, on an enlarged scale, of the cable with the insulation thereon in a slit condition which facilitates subsequent stripping thereof.

Reference is now made to the drawings wherein there is shown a cable insulation stripping apparatus, generally designated 10, demonstrating features and advantages of the present invention. The aparatus 10 includes a lower stationary frame, generally designated 12, on which some of the operating elements of the apparatus are mounted, and also an upper movable frame, generally designated 14, pivotally mounted about a pivot axis 16 for pivotal movement relative to the stationary frame 12 and carrying the remaining operating elements of the apparatus. As will be described in greater detail subsequently herein, the operating elements which are respectively mounted on the stationary and movable frames 12 and 14 include upper and lower cable-advancing means 18 and 20, respectively (see in particular FIG. 4), and also an upper and lower rotary knife 22 and 24, respectively. The cable-advancing means 18, 20 are effective to engage and advance the cable 26 past the rotary knives 22, 24, which in turn are effective to slit the cable insulation which facilitates the stripping thereof from the cable core, all as is shown in FIGS. 4 and 5. That is, and as best shown in FIG. 5, the cable 26 has a usual core 28 formed by a plurality of elongated filaments or strands which are protected and insulated by an outer covering 30. As is further generally the case, the outer insulation covering 30 is usually stripped from the core 28 in order to permit recovery of the valuable metals of the core. This stripping operation is facilitated by the apparatus 10 of the present invention wherein the insulation covering 30 is provided with slits 30a in opposite sides thereof which in an obvious manner permits the removal of the portions of the outer insulation covering 30 coextensive with the slits 30a. Prior to start-up of the apparatus 10, the cable 26 is readily positioned preparatory to the stripping operation in the apparatus by movement of the frame 14 thereabout from an open to a closed position relative to the lower frame 12. In this respect, the driving motors for the operating elements on the movable frame 14 are arranged to efficiently power these elements in the closed position of the movable frame 14 relative to the stationary frame 12 and yet do not interfere with movement of the frame 14 between the closed and open positions thereof.

Referring now to the details of construction of the stationary frame 12, such frame includes base structure in the form of front legs 32, a lower main platform 34, and the lower portion of an upstanding support 36 which maintains the apparatus 10 in an upright position. A pair of spaced-apart panels 38 and 40 are appropriately mounted on either side of the platform 34 and in turn function as supports for the operating elements of the stationary frame 12 housed therebetween.

Figure 2:
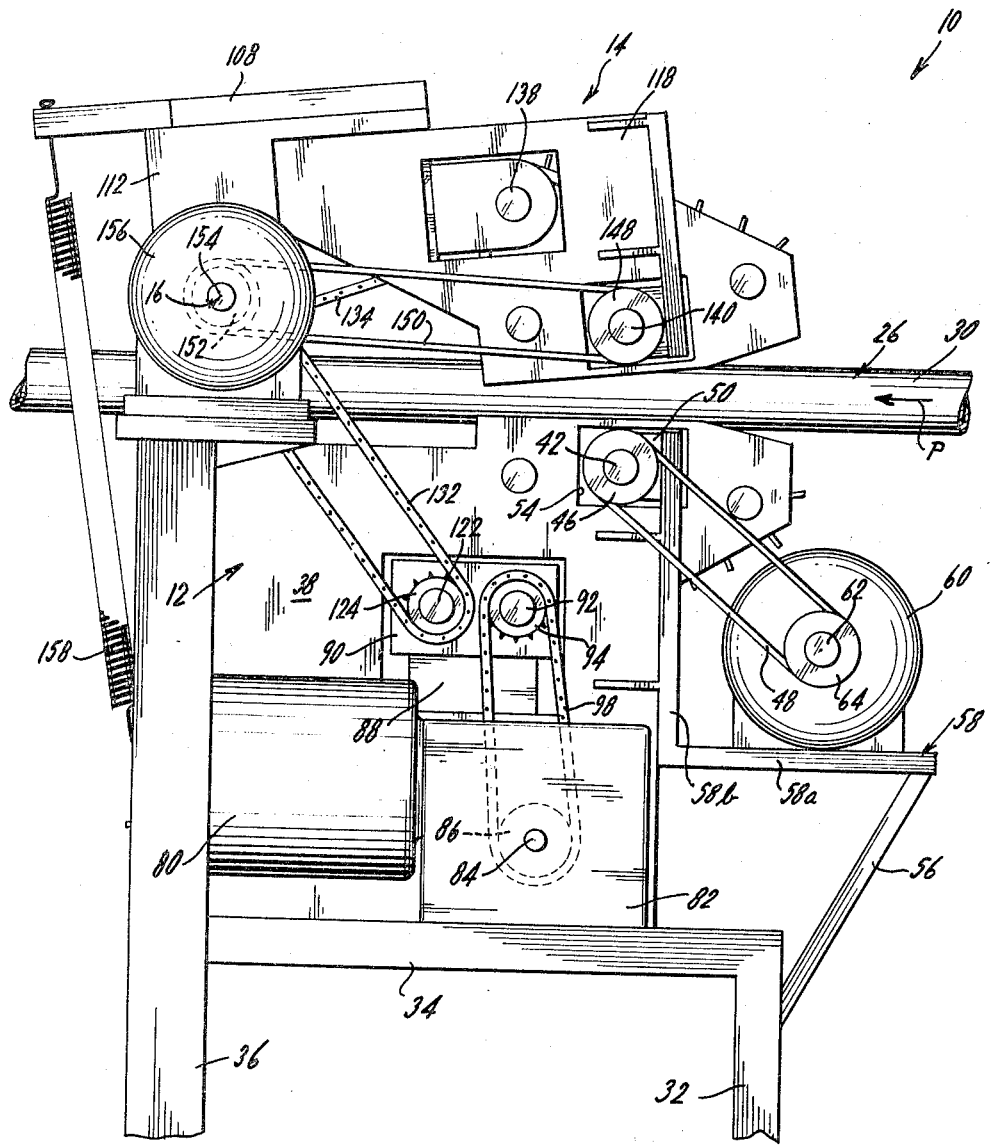
FIG. 2 is a rear elevational view illustrating further structural features.

As best seen in FIGS. 2 and 4, the previously mentioned rotary knife 24 is one of the operating elements supported on the stationary frame 12. The knife 24 is of conventional construction having a peripheral cutting edge thereon and is fixedly mounted on a drive shaft 42 which is appropriately journaled for rotation in a bearing 44. The drive shaft 42 extends through the bearing 44 and has a pulley 46 appropriately fixedly mounted thereon which has a driving pulley belt 48 trained thereabout. By comparing FIG. 4 with FIG. 2, it will be noted that the bearing 44 has mounting brackets 50 and 52 connecting the bearing to an upright support and permitting adjustments in the position of the bearing 44 within the clearance of an opening 54 in the side panel 38. This technique for making provision for adjustment in position of a bearing of the apparatus which mounts a drive shaft thereof is also used elsewhere in the construction of the apparatus 10 in similar circumstances where it is desirable to maintain the driving pulley belt connected to the shaft in a taut condition. Referring now to FIG. 2, it will be seen that mounted above the legs 32 at the end of the main platform 34 is bracing structure 56 which mounts an L-shaped platform 58 having a horizontal leg 58a and a vertical leg 58b. A motor 60 having a motor shaft 62 with a pulley 64 fixedly mounted thereon is supported on the horizontal leg 58a. An end of the pulley belt 48 is trained about the pulley 64 and completes the drive from the motor 60 to the pulley 46 of the rotary knife 24.

Also operatively mounted on the stationary frame 12 and effective to advance cable 26 along a feed path P past the rotary knife 24 is the previously mentioned cable-advancing means 20 formed by a pair of endless conveyors which are identical in construction and only the outer one of which, for brevity sake, will be described in detail herein and the other conveyor designated by the same reference numeral followed by the letter "a." Each conveyor includes an endless link chain body 66 disposed about a cooperating guide track 67 supported on a cross brace 65 and having a plurality of spaced conveyor flights 68 mounted therealong, the inner corner edge of which has a curved gripping surface 68a appropriately contoured to grip the cable 26. The chain body 66 is trained about three sprockets 70, 72 and 74, each of which is journaled for rotation on the outer panel 40 on the side facing the panel 38. As best seen in FIGS. 1, 2 the mounting for the sprocket 74 includes a shaft 92 journaled for rotation in a bearing block 90 on a vertically adjustable support 88 and further including a fixedly mounted sprocket 94. A drive connection to the sprocket 94 is made from a motor 80 located on the lower main platform 34 via a gear reduction box 82, a motor drive shaft 84 mounting a sprocket 86, and a pulley chain 98 appropriately trained about the sprockets 86 and 94. Thus, motor 80 is effective to drive the chain 66 through movement about the supporting sprockets 70, 72 and 74. To facilitate maintaining the cable-advancing means 20 in good repair an access opening 100 is provided in the panel 40 through which repairs are more easily and readily made with minimum dismantling of the apparatus. Similar access openings to facilitate maintainence are provided elsewhere in the construction of the apparatus 10 where appropriate.

Figure 3:
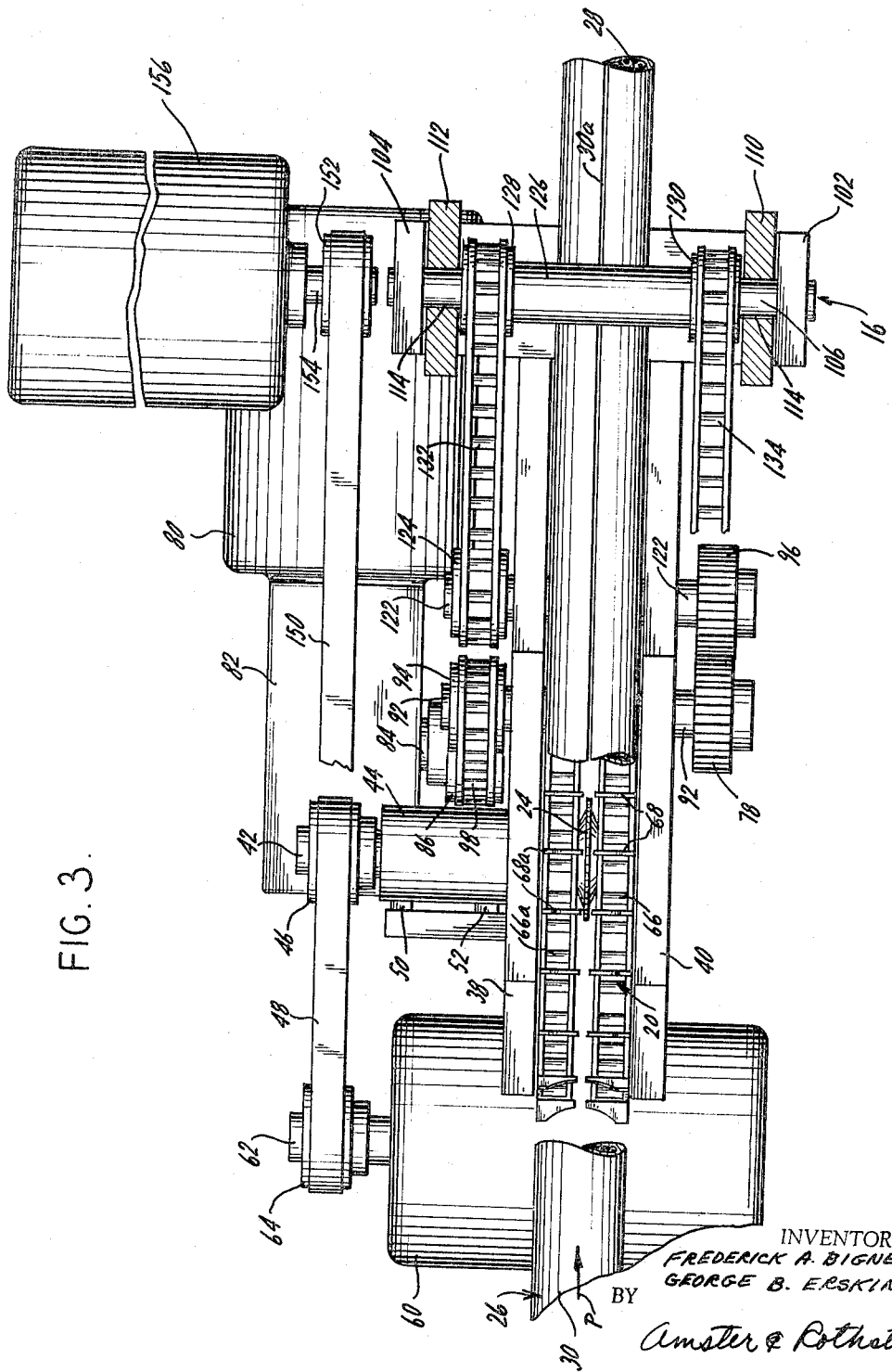
FIG. 3 is a plan view of the apparatus, in section taken on line 3—3 of FIG. 1, a portion of the cable being processed for stripping through the apparatus being omitted to better illustrate structural features of the cable-advancing means thereof.

Attention is now directed to the construction of the movable frame 14 and the operating elements mounted thereon. At an elevated point at one end of the stationary frame 12 are a pair of upstanding blocks 102 and 104 which, as best seen in FIG. 3, mount therebetween a stationary shaft 106, the longitudinal axis of which defiines the pivot axis 16 previously referred to about which the movable frame 14 is movable towards and away from the stationary frame 12. Pivotally mounted on the shaft 106 is a base member 108 of the frame 14 having depending legs 110 and 112 each of which has an opening 114 therein accommodating an end of the shaft 106. Forward of the legs 110, 112, the base member 108 has a pair of spaced-apart supporting panels 116, 118 which serve the identical function as the panels 40, 38 of the stationary frame 12 of mounting therebetween the operating elements of the movable frame 14. These operating elements include the previously referred to upper cable-advancing means 18 which is identical in construction to the lower cable-advancing means 20 and which, for brevity sake, will therefore only be generally described. Detailed description will be made however of the manner in which the means 18 is driven through movement to provide feed of the cable 26 along the path of movement P between the upper frame 14 and the lower stationary frame 12. The other significant operating element on the frame 14 is the previously referred to rotary knife 22 which also is similar in construction and mode of operation to the previously described rotary knife 24 and thus will not be further described except as to the manner in which such rotary knife is powered in rotation.

The driving power for the endless conveyors or chains 66b, 66c of the cable-advancing means 18 is derived from the motor 80 which it will be recalled also powers the lower cable-advancing means 20 through movement. Tracing this transmission of power with particular reference to FIGS. 2 and 3, there is shown a gear 96 mounted on a shaft 122 and in meshing engagement with a gear 78 fixedly mounted on the power input shaft 92 of the lower cable-advancing means 20 and which gear 96 and shaft 122 are thus driven in rotation in unison with the gear 78 by the motor 80. As best shown in FIG. 2, this rotation is transmitted to a sprocket 124 mounted on the opposite end of the shaft 122. Disposed for rotation about the shaft 106 which defines the pivot axis 16 is a sleeve bearing 126 which at each opposite end respectively mounts a sprocket 128 and 130, the sprocket 128 cooperating with the sprocket 124 to accommodate a drive chain 132 trained thereabout. The rotation transmitted via the drive chain 132 to the sprockets 128 and 130 is further distributed via a drive chain 134 trained about the sprocket 130 and about a sprocket 136 mounted on a shaft 138 which is the functional equivalent of the power input shaft 92 of the lower cable-advancing means 20. That is, when the shaft 138 is powered in rotation this in turn powers the endles chains 66b and 66c of the upper cable-advancing means 18 through movement along the path defined by the three spaced sprockets and the individual tracks 67b, 67c on the cross brace 65a supporting each of these endless chains, the sprockets 70b and 72b of the endless chain 66b being illustrated in FIG. 1.

Turning now to the drive connection for the upper rotary knife 22, the same as best shown in FIG. 4 includes a drive shaft 140 mounting the rotary knife 22 and journaled for rotation in a bearing 142 which has mounting brackets 144, 146 permitting minor adjustment in the position of the bearing 142. At the opposite extending end the drive shaft 140 mounts a pulley 148 which has trained thereabout one end of a pulley belt 150 having a predetermined size or extent. As is best ssen in FIG. 1 in conjunction with FIG. 3, the other end of the pulley belt 150 is trained about a pulley 152 fixedly mounted on a motor shaft 154 of a motor 156 which supplies the powering force for rotating the upper rotary knife 22. Consistent with this function, the motor 156 is of a substantial size and thus cannot be readily mounted for movement on the movable frame 14. Yet, the movable frame 14 must have a degree of pivotal movement to provide a closed and an open position relative to the stationary frame 12 so that the movable frame 14 can initially be closed upon cable 26 interposed therebetween, the cable then being engaged and fed by the upper and lower cable-advancing means 18, 20 through feed movement P past the upper and rotary knives 22, 24, and then the frame 14 moved into the open position to release the cable. To enable this degree of movement in the movable frame 14 and yet maintain the necessary taut condition in the pulley belt 150 connecting the motor 156 to the rotary knife 22, the shaft 154 of the motor 156 is located adjacent the shaft 106 and oriented such that the rotational axis ofthe motor shaft 154 is in substantial alignment with the pivot axis 16. Stated another way, during pivotal movement of the movable frame 14, the pivot axis 16 constitutes a fixed point about which this movement takes place and relative to which there is no displacement with respect to any point on the movable frame 14. Thus, the distance between the pulleys 148 and 152 at all times remains constant and this in turn assures that the taut condition of the belt 150 will be maintained and will be effective to drive the rotary knife 22 in the closed position of the frame 14 despite frequent movement thereof into and out of this operative position. This is similarly true for the drive chain 134 of the upper cable-advancing means 18 since the sprocket 130 is actually mounted on the shaft 106 which defines the pivot axis 16.

Completing a preferred embodiment of the apparatus 10 hereof is a spring 158 connected, as at 160, between the stationary frame 12 and movable frame 14 to counterbalance the weight at the forward end of the frame 14 so that the open and closed positions of the frame 14 relative to the stationary frame 12 are easily provided by the operator of the apparatus.

From the foregoing description it should be readily appreciated that the apparatus 10 will readily accommodate cable 26 interposed between the operating elements thereof respectively mounted on the two support frames 12 and 14 thereof. Moreover, in the position of the movable frame 14 closed upon such interposed cable, the cooperating elements of the apparatus 10, namely the cable-advancing means 18 and 20 and the rotary knives 22 and 24 cooperate with each other to process the cable 26 into a condition having slits 30a in the insulating jacket thereof which readily facilitates the stripping of this jacket from about the cable core 28. Ths movement in the frame 14 does not effect the drive connections to the operating elements on the frame 14 by virtue of the strategic location of these drive connections relative to the frame pivot axis 16, all in the manner as has been described in detail herein.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A cable insulation stripping apparatus comprising a stationary support frame, a movable support frame mounted for pivotal movement about a predetermined pivot axis relative to said stationary support frame, cooperating cable-advancing means on said support frames for engaging and feeding cable having insulation thereabout along a feed path between said support frames, a cooperating pair of rotary knives respectively mounted on said support frames along said feed path and effective to slit said cable insulation preparatory to the stripping thereof from said cable and a drive for each of said rotary knives, the drive for said rotary knife on said movable frame including a motor having a drive shaft and a drive connection of a predetermined extent therefrom to said rotary knife, said motor being located adjacent said predetermined pivot axis such that said drive shaft thereof and said predetermined pivot axis are coaxial, whereby said drive connection remains of the same predetermined extent in all pivotal positions of said movable support frame about said predetermined pivot axis.

2. A cable insulation stripping apparatus as defined in claim 1 wherein said drive connection to said rotary knife on the movable frame includes a pair of pulleys respectively operatively mounted to said motor drive shaft and to said rotary knife and a pulley belt of a predetermined extent trained about said pair of pulleys.

3. A cable insulation stripping apparatus as defined in claim 1 wherein said cable-advancing means on said movable support frame includes an endless conveyor mounting cable-gripping means thereon and having a drive connection of a predetermined extent operatively connected thereto to drive said endless conveyor through movement, said drive connection being supported at a predetermined point remote from said connection wtih said endless conveyor and at a location adjacent said predetermined pivot axis, whereby said drive connection remains of said same predetermined extent in all pivotal positions of said movable support frame about said predetermined pivot axis.

4. A cable insulation stripping apparatus as defined in claim 3 wherein said cable-advancing means on said stationary support frame similarly includes an endless conveyor mounting cable-gripping means thereon and having a drive means therefor, said drive means including a motor having a first operative connection to said endless conveyor of said stationary support frame for driving the same through movement and a second operative connection at said predetermined point adjacent said predetermined pivot axis to said drive connection of the endless conveyor of the movable support frame, whereby both of the conveyors of said cable-advancing means are uniformly driven through movement by said motor.

5. A cable insulation stripping apparatus comprising a pair of frames having opposing support sections in facing relationship with each other, means mounting said frames for relative movement therebetween for closing said support frames about a cable having insulation thereabout interposed between said frames, each of said frames having a pair of endless conveyors spaced adjacent to each other along the support section thereof such that the operation of said endless conveyors are effective to move said interposed cable along a feed path oriented along said support sections, and a rotary knife operatively mounted on each frame between each pair of conveyors thereof and along said feed path, whereby the operation of said knives are effective to slit the insulation of said cable being moved along said feed path past said knives.

6. A cable insulation stripping apparatus as defined in claim 5 wherein each conveyor includes an endless chain, plural sprockets mounted at spaced locations on said frame for supporting said endless chain thereon for movement through a closed path and plural conveyor flights having cable-gripping surfaces thereon attached at spaced locations along said endless chain.

7. A cable insulation stripping apparatus as defined in claim 6 wherein said closed paths of movement of the pairs of chains of each frame are oriented in substantially parallel planes and each rotary knife is located between said planes and is arranged to rotate in a plane substantially parallel thereto.

8. A cable insulation stripping apparatus as defined in claim 5 including a motor having an operative drive connection to each of said pairs of conveyors on each frame and effective to drive both said pairs of conveyors through movement along said feed path at a uniform speed.

9. A cable insulation stripping apparatus as defined in claim 5 wherein each rotary knife of each frame has an independent motor operatively connected thereto for powering the same in rotation.

References Cited by the Examiner

UNITED STATES PATENTS

| | | | |
|---|---|---|---|
| 923,426 | 6/1909 | Gisriel | 83—425 |
| 1,052,271 | 2/1913 | Pessin | 81—9.51 |
| 2,319,198 | 5/1943 | Barrans et al. | 83—924 X |
| 2,516,176 | 7/1950 | Bjork | 144—117 |
| 3,175,430 | 3/1965 | Smith et al. | 81—9.51 |

FOREIGN PATENTS 2,225,280  6/1924  Great Britain.

WILLIAM FELDMAN, Primary Examiner.

M. S. MEHR, Examiner.